United States Patent
Inagaki et al.

(10) Patent No.: US 11,367,585 B2
(45) Date of Patent: Jun. 21, 2022

(54) DIRECT-CURRENT CIRCUIT BREAKER

(71) Applicant: Mitsubishi Electric Corporation, Tokyo (JP)

(72) Inventors: Takashi Inagaki, Tokyo (JP); Sho Tokoyoda, Tokyo (JP); Kenji Kamei, Tokyo (JP); Ryo Kimura, Tokyo (JP); Makoto Miyashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 3 days.

(21) Appl. No.: 16/628,457

(22) PCT Filed: Jul. 11, 2017

(86) PCT No.: PCT/JP2017/025310
§ 371 (c)(1),
(2) Date: Jan. 3, 2020

(87) PCT Pub. No.: WO2019/012609
PCT Pub. Date: Jan. 17, 2019

(65) Prior Publication Data
US 2021/0134544 A1    May 6, 2021

(51) Int. Cl.
*H01H 33/59* (2006.01)
*H02H 3/087* (2006.01)

(52) U.S. Cl.
CPC .......... *H01H 33/596* (2013.01); *H02H 3/087* (2013.01)

(58) Field of Classification Search
CPC ............................. H01H 33/596; H02H 3/087
See application file for complete search history.

(56) References Cited

U.S. PATENT DOCUMENTS 5,214,557 A * 5/1993 Hasegawa ............ H01H 33/596
361/4
2013/0020881 A1 * 1/2013 Panousis ................ H01H 33/75
307/113

(Continued)

FOREIGN PATENT DOCUMENTS

JP      S58-34525 A      3/1983
JP      2005190671 A     7/2005

(Continued)

OTHER PUBLICATIONS

Extended European Search Report dated Aug. 24, 2020 for corresponding European patent application No. 17917537.7, 12 pages.

(Continued)

*Primary Examiner* — Jared Fureman
*Assistant Examiner* — Christopher J Clark
(74) *Attorney, Agent, or Firm* — Buchanan Ingersoll & Rooney PC

(57) ABSTRACT

A direct-current circuit breaker includes a first main circuit breaker inserted into a first direct-current line, a resonance circuit connected in parallel to the first main circuit breaker, a MOSA connected in parallel to the first main circuit breaker via the resonance circuit, a second main circuit breaker inserted into a second direct-current line, a switch connected in series to the second main circuit breaker, a resonance circuit connected in parallel to the second main circuit breaker, and a MOSA connected in parallel to the second main circuit breaker via the resonance circuit. The second direct-current line is a line that branches off from the first direct-current line and returns to the first direct-current line. The switch is inserted upstream of the second direct-current line.

11 Claims, 13 Drawing Sheets

(56) References Cited

U.S. PATENT DOCUMENTS

| | | | |
|---|---|---|---|
| 2015/0022928 A1* | 1/2015 | Mohaddes Khorassani | ............... H02H 1/0007 361/93.7 |
| 2017/0271100 A1 | 9/2017 | Ka et al. | |
| 2017/0288388 A1 | 10/2017 | Horinouchi et al. | |

FOREIGN PATENT DOCUMENTS

| | | |
|---|---|---|
| WO | 2016047209 A1 | 3/2016 |
| WO | 2016056274 A1 | 4/2016 |

OTHER PUBLICATIONS

International Search Report (PCT/ISA/210) dated Oct. 3, 2017, by the Japan Patent Office as the International Searching Authority for International Application No. PCT/JP2017/025310.

Japanese Office Action (Notice of Reasons for Refusal) dated Jan. 9, 2018, issued in corresponding Japanese Patent Application No. 2017-562377, and a English Translation thereof. (7 pages).

Written Opinion (PCT/ISA/237) dated Oct. 3, 2017, by the Japan Patent Office as the International Searching Authority for International Application No. PCT/JP2017/025310.

Loume, D.S. et al., "A multi-vendor protection strategy for HVDC grids based on low-speed DC circuit breakers", ACDC 2017 The 13th IET international conference on AC and DC Power transmission, 2017.

* cited by examiner

DIRECT-CURRENT CIRCUIT BREAKER

FIELD

The present invention relates to a direct-current circuit breaker that interrupts a direct current.

BACKGROUND

In recent years, the development of high-voltage direct-current circuit breakers has accelerated in various countries toward the achievement of high-voltage direct-current (HVDC) transmission. For the HVDC transmission, a high-voltage direct current flows in a transmission line. Unlike an alternating current, the direct current has no current zero point. In order to interrupt the direct current, thus, a current zero point is forcibly formed between electrodes of a main circuit breaker. Patent Literature 1 below discloses a technique of providing a commutation circuit including a capacitor and a reactor for superimposing a resonance current to thereby form a current zero point, such that a direct current is interrupted at the current zero point.

For the direct-current circuit breaker described in Patent Literature 1, mechanical switches are used as a main circuit breaker and a closing switch. A direct-current circuit breaker including a mechanical switch has a characteristic of longer operation time than a direct-current circuit breaker including a power electronics element.

A main circuit breaker of a direct-current circuit breaker is closed immediately after a fault current is interrupted so that power transmission in a system is resumed. This control is called "high-speed reclosing".

For direct-current circuit breakers used for HVDC transmission, there are currently no industry standards for high-speed reclosing. For alternating-current circuit breakers, on the other hand, IEC62271-100 of the International Electrotechnical Commission (IEC) provides a standard for high-speed reclosing, which is named "Dead time". An example of a typical value of "Dead time" is 300 ms. That is, conventional alternating-current circuit breakers are required to operate at a high speed of about 300 ms for the high-speed reclosing.

CITATION LIST

Patent Literature

Patent Literature 1: Japanese Patent Application Laid-open No. S58-34525

SUMMARY

Technical Problem

As described above, the conventional alternating-current circuit breakers are required to operate at a high speed of about 300 ms for the high-speed reclosing. Accordingly, a direct-current circuit breaker used for HVDC power transmission may be required to operate at a similar high speed. Unfortunately, there is a restriction on the direct-current circuit breaker that a capacitor of a commutation circuit must be charged in advance before a main circuit breaker is opened. In addition, as described above, a direct-current circuit breaker using a mechanical switch has a drawback of long operation time. For these reasons, the configuration of the conventional direct-current circuit breaker can fail to fulfill operating duties of high-speed reclosing in HVDC transmission.

The present invention has been made in view of the above, and an object thereof is to provide a direct-current circuit breaker that can fulfill operating duties of high-speed reclosing in HVDC transmission.

Solution to Problem

In order to solve the above-described problems and achieve the object, a direct-current circuit breaker according to the present invention includes: a first main circuit breaker inserted into a first direct-current line; a first resonance circuit connected in parallel to the first main circuit breaker; a first energy absorption unit connected in parallel to the first main circuit breaker via the first resonance circuit; a second main circuit breaker inserted into a second direct-current line; a first switch connected in series to the second main circuit breaker; a second resonance circuit connected in parallel to the second main circuit breaker; and a second energy absorption unit connected in parallel to the second main circuit breaker via the second resonance circuit. The second direct-current line is a line that branches off from the first direct-current line and returns to the first direct-current line. The first switch is inserted upstream of the second direct-current line.

Advantageous Effects of Invention

The direct-current circuit breaker according to the present invention achieves an effect of fulfilling the operating duties of high-speed reclosing in the HVDC transmission.

DESCRIPTION OF EMBODIMENTS

Hereinafter, a direct-current circuit breaker according to each embodiment of the present invention will be described in detail with reference to the drawings. The present invention is not limited by the following embodiments. In the following descriptions, electrical connection will be simply referred to as "connection".

First Embodiment

Figure 1:
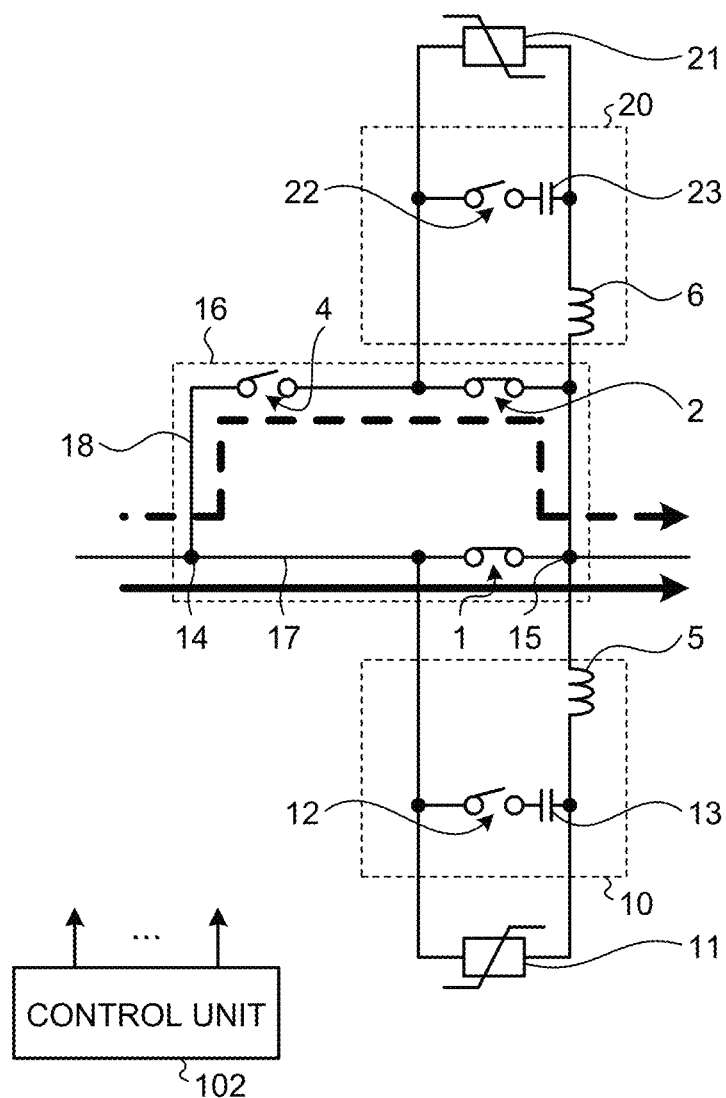
FIG. 1 is a diagram illustrating an example circuit configuration of a direct-current circuit breaker according to a first embodiment.
Figure 1A:
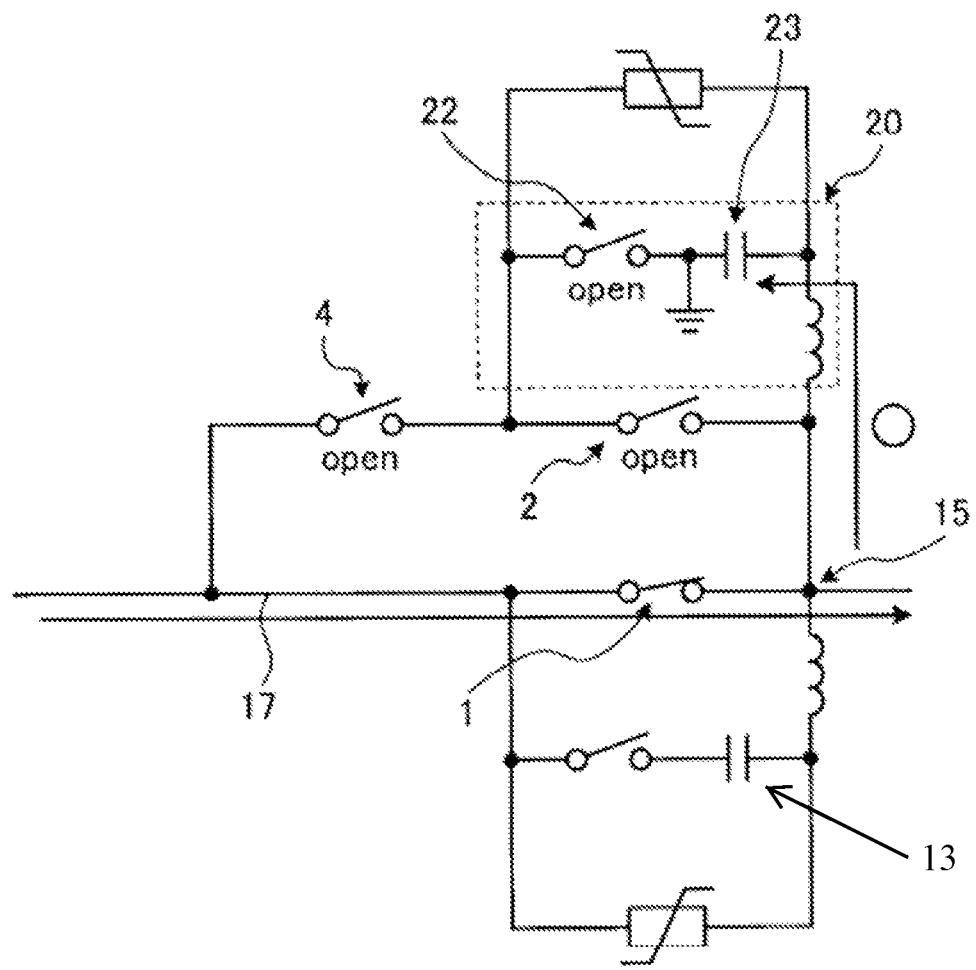
FIG. 1A is a diagram illustrating another example circuit configuration of the direct-current circuit breaker of FIG. 1.
Figure 2:
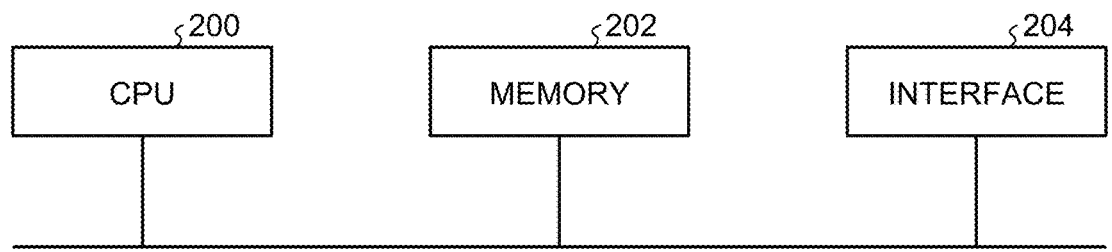
FIG. 2 is a diagram illustrating an example of a hardware configuration that implements functions of a control unit in the first embodiment.

FIG. 1 is a diagram illustrating an example circuit configuration of a direct-current circuit breaker according to a first embodiment. FIG. 2 is a diagram illustrating an example of a hardware configuration that implements functions of a control unit in the first embodiment.

A direct-current circuit breaker 100 according to the first embodiment includes main circuit breakers 1 and 2, a switch 4, resonance circuits 10 and 20, lightning arresters (metal oxide surge arrestors: hereinafter referred to as "MOSA") 11 and 21, and a control unit 102. The main circuit breaker 1 is a first main circuit breaker. The main circuit breaker 2 is a second main circuit breaker. The switch 4 is a first switch. The MOSA 11 is an example of a first energy absorption unit. The MOSA 21 is an example of a second energy absorption unit.

The main circuit breaker 1 is inserted into a direct-current line 17 that is a main line. The main circuit breaker 2 is inserted into a direct-current line 18. The direct-current line 18 is a branch line that branches off from the direct-current line 17 that is the main line. The direct-current line 18 branches off from the direct-current line 17 and returns to the direct-current line 17. The main line may be rephrased as a "first direct-current line". The branch line may be rephrased as a "second direct-current line".

The switch 4 is a switch for high-speed reclosing. The switch 4 is inserted into the direct-current line 18. That is, the main circuit breaker 2 and the switch 4 are connected in series. The main circuit breaker 1 is connected to opposite ends of a series circuit including the main circuit breaker 2 and the switch 4. That is, the main circuit breaker 1 is connected in parallel to the series circuit including the main circuit breaker 2 and the switch 4. The main circuit breaker 1, the main circuit breaker 2, and the switch 4 make up a parallel circuit 16. The parallel circuit 16 includes a connection point 14 and a connection point 15. The connection point 14 is an upstream connection point of the direct-current line 17 and the direct-current line 18. The connection point 15 is a downstream connection point of the direct-current line 17 and the direct-current line 18. The connection point 14 may be referred to as a "first connection point" and the connection point 15 may be referred to as a "second connection point".

A current flows in the direct-current line 17 through a path indicated by a thick solid line, and a current flows in the direct-current line 18 through a path indicated by a thick broken line. Directions indicated by arrows represent directions of flows of current. That is, the left side of the figure is upstream and the right side of the figure is downstream.

When the directions of flow of current are defined as described above, the connection point 14 is located upstream of the parallel circuit 16, and the connection point 15 is located downstream of the parallel circuit 16. The switch 4 is disposed upstream of the main circuit breaker 2. In other words, the main circuit breaker 2 is disposed downstream of the switch 4.

The resonance circuit 10 defines a first resonance circuit. The resonance circuit 10 is a circuit that, when a fault current flows in the direct-current line 17, generates a resonance current to be superimposed on the fault current. The resonance circuit 10 includes a reactor 5, a closing switch 12, and a capacitor 13. The capacitor 13 accumulates charges serving as a source of the resonance current. An example of the closing switch 12 is a discharge gap device. The reactor 5, the closing switch 12, and the capacitor 13 are connected in series.

The MOSA 11 is connected in parallel to the main circuit breaker 1 via the resonance circuit 10. Specifically, the MOSA 11 is connected in parallel to a series circuit including the closing switch 12 and the capacitor 13.

The resonance circuit 20 defines a second resonance circuit. The resonance circuit 20 is a circuit that, when a fault current flows in the direct-current line 18, generates a resonance current to be superimposed on the fault current. The resonance circuit 20 includes a reactor 6, a closing switch 22, and a capacitor 23. The capacitor 23 accumulates charges serving as a source of the resonance current. An example of the closing switch 22 is a discharge gap device. The reactor 6, the closing switch 22, and the capacitor 23 are connected in series.

The MOSA 21 is connected in parallel to the main circuit breaker 2 via the resonance circuit 20. Specifically, the MOSA 21 is connected in parallel to a series circuit including the closing switch 22 and the capacitor 23.

The resonance circuit 10 is connected in parallel to the main circuit breaker 1. More specifically, one end of the resonance circuit 10 is connected to one end of the main circuit breaker 1, and the opposite end of the resonance circuit 10 is connected to the opposite end of the main circuit breaker 1. In FIG. 1, the one end of the resonance circuit 10 is illustrated as being connected to the connection point 15, but the one end of the resonance circuit 10 may be connected to a point other than the connection point 15 as long as that point is located at the one end of the main circuit breaker 1.

The resonance circuit 20 is connected in parallel to the main circuit breaker 2. More specifically, one end of the resonance circuit 20 is connected to one end of the main circuit breaker 2. The opposite end of the resonance circuit 20 is connected to the opposite end of the main circuit breaker 2.

The control unit 102 controls the opening/closing of the main circuit breakers 1 and 2, the switch 4, and the closing switches 12 and 22. The main circuit breakers 1 and 2, the switch 4, and the closing switches 12 and 22 may be collectively referred to as "switches".

The functions of the control unit 102 can be implemented by a configuration including a central processing unit (CPU) 200 that performs calculation, a memory 202 that stores a program read by the CPU 200, and an interface 204 that inputs/outputs signals, as illustrated in FIG. 2. Programs for controlling the opening/closing of the main circuit breakers 1 and 2, the switch 4, and the closing switches 12 and 22 are stored in the memory 202. The control unit 102 exchanges necessary information through the interface 204, and causes the CPU 200 to execute programs stored in the memory 202, thereby performing control described later.

The CPU 200 may be a calculation unit such as a microprocessor, a microcomputer, a processor, or a digital signal processor (DSP). The memory 202 corresponds to a nonvolatile or volatile semiconductor memory such as a random access memory (RAM), a read only memory (ROM), a flash memory, an erasable programmable ROM (EPROM), or an electrically EPROM (EEPROM).

Figure 3:
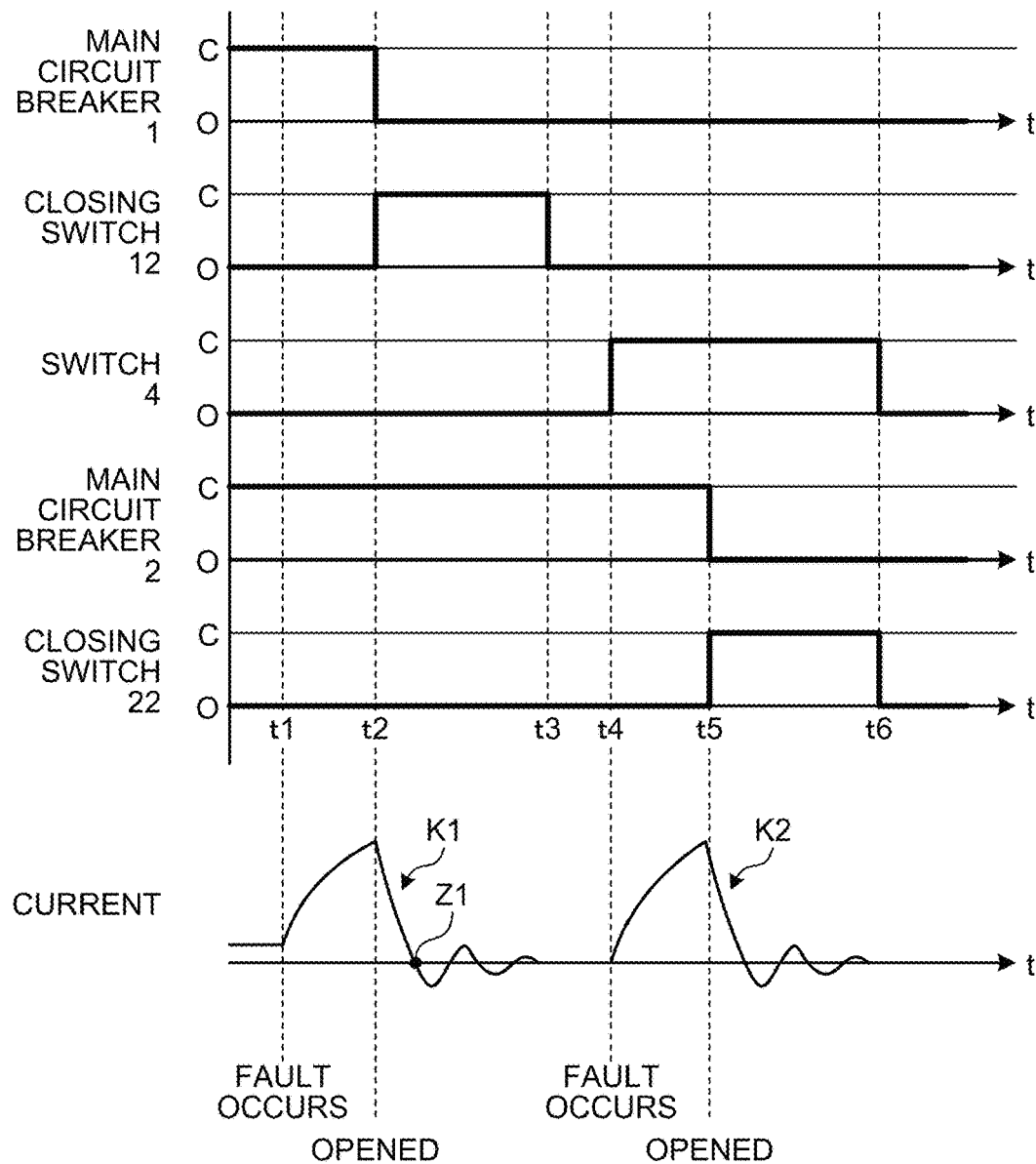
FIG. 3 is a timing chart for explaining an operation of the direct-current circuit breaker according to the first embodiment.

Next, an operation of the direct-current circuit breaker 100 according to the first embodiment will be described with reference to FIGS. 1 and 3. FIG. 3 is a timing chart for explaining the operation of the direct-current circuit breaker 100 according to the first embodiment. The control discussed below is performed by the control unit 102. For simplification of description of the operation of the direct-current circuit breaker 100, the control unit 102, which plays a main role in performing the control, is not mentioned in the following description of the operation.

FIG. 3 illustrates states of the main circuit breaker 1, the closing switch 12, the switch 4, the main circuit breaker 2, and the closing switch 22 in order from top to bottom. In addition, a current flowing in the direct-current line 17 or the direct-current line 18 is illustrated in a lower part of FIG. 3.

In the timing chart of FIG. 3, character "C" is an abbreviation for "close", and character "O" is an abbreviation for "open". Character "C" means a state where contacts of each switch are electrically connected, that is, that the switch is "closed". Character "O" means a state where contacts of each switch are not electrically connected, that is, that the switch is "open".

A state where no fault has occurred on the direct-current line is called an "initial state". The contacts of each switch illustrated in FIG. 1 are in the initial state. In FIG. 1, control is performed so that the main circuit breaker 1 is "closed", the closing switch 12 is "open", the switch 4 is "open", the main circuit breaker 2 is "closed", and the closing switch 22 is "open". At that time, a current indicated by a thick solid line flows in the direct-current line 17.

When a fault occurs at time t1, a fault current flows in the direct-current line 17, and the current increases. In order to interrupt the fault current, the main circuit breaker 1 is opened at time t2. At that time, in order to form a current zero point at the contacts of the main circuit breaker 1, the closing switch 12 is closed. Although the main circuit breaker 1 is opened, the current still continues to flow as indicated by waveform K1. From time t2 to a first current zero point Z1, a current flows through the MOSA 11. Characteristics of MOSA increases resistance from time t2 toward the first current zero point Z1, and thereby the current decreases. After the first current zero point Z1, the current flows through the closing switch 12. The current flowing through the closing switch 12 is attenuated by the resistance on a current path, and is finally interrupted at time t3.

When the closing switch 12 is opened at time t3, control for the above-described high-speed reclosing is performed in order to resume power transmission. In the configuration of the first embodiment, the switch 4 is closed in the high-speed reclosing.

By the control for the high-speed reclosing, the switch 4 enters a closed state at time t4. Because the main circuit breaker 1 is in an open state and the main circuit breaker 2 is in a closed state, a current indicated by a thick broken line flows in the direct-current line 18. That is, the current due to first reclosing flows in the direct-current line 18.

When a fault occurs again after the control for the high-speed reclosing, a fault current flows in the direct-current line 18 and the current increases. FIG. 3 illustrates a situation where a second fault occurs at time t4, that is, immediately after the switch 4 is closed.

Due to the second fault at time t4, the main circuit breaker 2 is opened at time t5. At that time, in order to form a current zero point at the contacts of the main circuit breaker 2, the closing switch 22 is closed.

Although the main circuit breaker 2 is opened, the current still continues to flow as indicated by waveform K2. However, as with the case of the fault at time t1, the resistance increases due to the characteristics of MOSA, and thereby the current of waveform K2 decreases. When the current decreases, the closing switch 22 is opened. FIG. 3 illustrates, by way of example, a situation where the switch 4 and the closing switch 22 are simultaneously opened at time t6. The closing switch 22 is opened simultaneously with the switch 4 or may be opened later than the switch 4.

Next, advantageous effects of the direct-current circuit breaker 100 according to the first embodiment will be described. The main features of the direct-current circuit breaker 100 according to the first embodiment are as follows.

(1) The main circuit breaker 2 and the resonance circuit 20 are added to a basic configuration including the main circuit breaker 1 and the resonance circuit 10 for interrupting a fault, and the switch 4 for high-speed reclosing is added in series to the main circuit breaker 2.

(2) The switch 4 performs high-speed reclosing.

(3) The main circuit breaker 2 and the resonance circuit 20 thus added perform a second interruption.

If the main circuit breaker 1 used for a first interruption is closed again, it is conventionally required that the reclosing be performed after a mechanical operation delay of the main circuit breaker 1. On the other hand, in the first embodiment, the reclosing can be performed by the main circuit breaker 2 without being performed after the inevitable mechanical operation delay when the main circuit breaker 1 used for the first interruption is closed again.

For the direct-current circuit breaker including only the main circuit breaker 1 and the resonance circuit 10, when the resonance circuit 10 is used in the first fault, the capacitor 13 of the resonance circuit 10 is in a discharge state. For this reason, when the resonance circuit 10 is used in the second fault, it is necessary to wait a time for recharging the capacitor 13. On the other hand, in the first embodiment, the resonance circuit 20 can be used in the second fault. For this reason, the second interruption can be performed without waiting the time for recharging the capacitor 13 of the resonance circuit 10.

The above features of the direct-current circuit breaker 100 according to the first embodiment is advantageous in that the high-speed reclosing can be performed in a short time compared with the current circuit breaker including only the main circuit breaker 1 and the resonance circuit 10. As a result, the direct-circuit breaker 100 can fulfill operating duties of high-speed reclosing in HVDC transmission.

In addition, the direct-current circuit breaker 100 according to the first embodiment can solve the problems of mechanical operation delay of the main circuit breaker 1 and of recharging of the resonance circuit 10, as described above. Even when the operation time for the high-speed reclosing is changed to a shorter one than the current one of 300 ms, the direct-current circuit breaker 100 can provide scalability that meets a request for the changed operation time.

FIG. 1 illustrates the configuration in which one circuit unit including the main circuit breaker 2 connected in parallel to the main circuit breaker 1, the resonance circuit 20, the MOSA 21, and the switch 4 connected in series to the main circuit breaker 2 is added to a basic configuration including the main circuit breaker 1, the resonance circuit 10, and the MOSA 11, but there is no limitation to the configuration. A plurality of circuit units each including the main circuit breaker 2, the switch 4, the resonance circuit 20, and the MOSA 21 may be provided, and each of the circuit units may be configured to be connected in parallel to the main circuit breaker 1.

Figure 4:
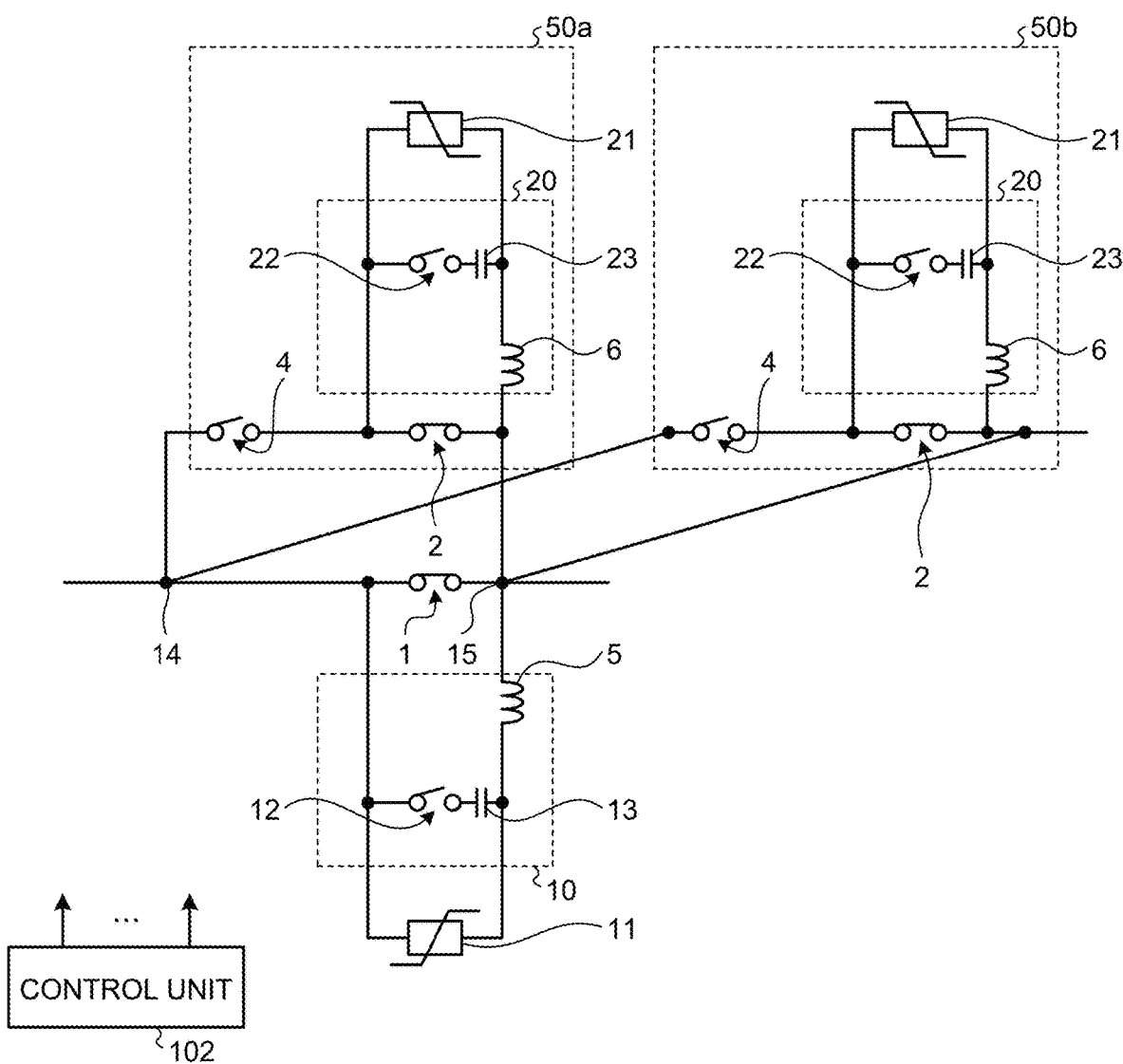
FIG. 4 is a diagram illustrating another example circuit configuration of the direct-current circuit breaker according to the first embodiment.

FIG. 4 discloses a configuration that includes, in addition to a first circuit unit 50a including the main circuit breaker 2, the switch 4, the resonance circuit 20, and the MOSA 21, a second circuit unit 50b including the same components as those of the first circuit unit 50a. For the configuration illustrated in FIG. 4, the second circuit unit 50b can be used when a failure occurs in the first circuit unit 50a for some reason such as failure to sufficiently charge the capacitor 23 of the first circuit unit 50a, and a lightning arrester of the first circuit unit 50a having already absorbed the fault current plural times.

Second Embodiment

Figure 5:
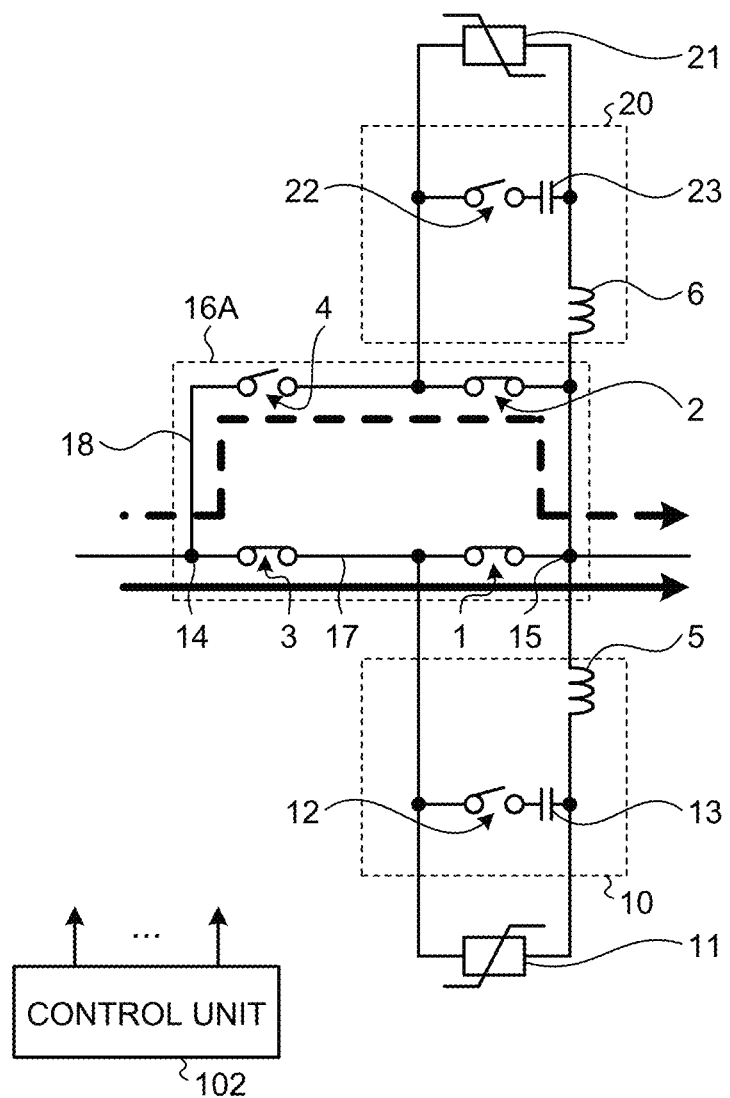
FIG. 5 is a diagram illustrating an example circuit configuration of a direct-current circuit breaker according to a second embodiment.

FIG. 5 is a diagram illustrating an example circuit configuration of a direct-current circuit breaker according to a second embodiment. A direct-current circuit breaker 100A according to the second embodiment illustrated in FIG. 5 differs from the direct-current breaker of the first embodiment illustrated in FIG. 1 in that a parallel circuit 16A replaces the parallel circuit 16. The parallel circuit 16A in FIG. 5 differs from the parallel circuit 16 of FIG. 1 in that a switch 3 as a second switch is inserted into the direct-current line 17. The switch 3 is a switch for high-speed reclosing.

In FIG. 5, the main circuit breaker 1 and the switch 3 are connected in series. A series circuit including the main circuit breaker 1 and the switch 3 is connected to opposite ends of a series circuit including the main circuit breaker 2 and the switch 4. That is, the series circuit including the main circuit breaker 1 and the switch 3 is connected in parallel to the series circuit including the main circuit breaker 2 and the switch 4. The main circuit breaker 1 is disposed downstream of the switch 3. In other words, the switch 3 is disposed upstream of the main circuit breaker 1. The other components of the direct-current circuit breaker 100A are the same as or equivalent to those in FIG. 1. The same or equivalent components are denoted by the same reference numerals, and the duplicate description thereof will be omitted.

Figure 6:
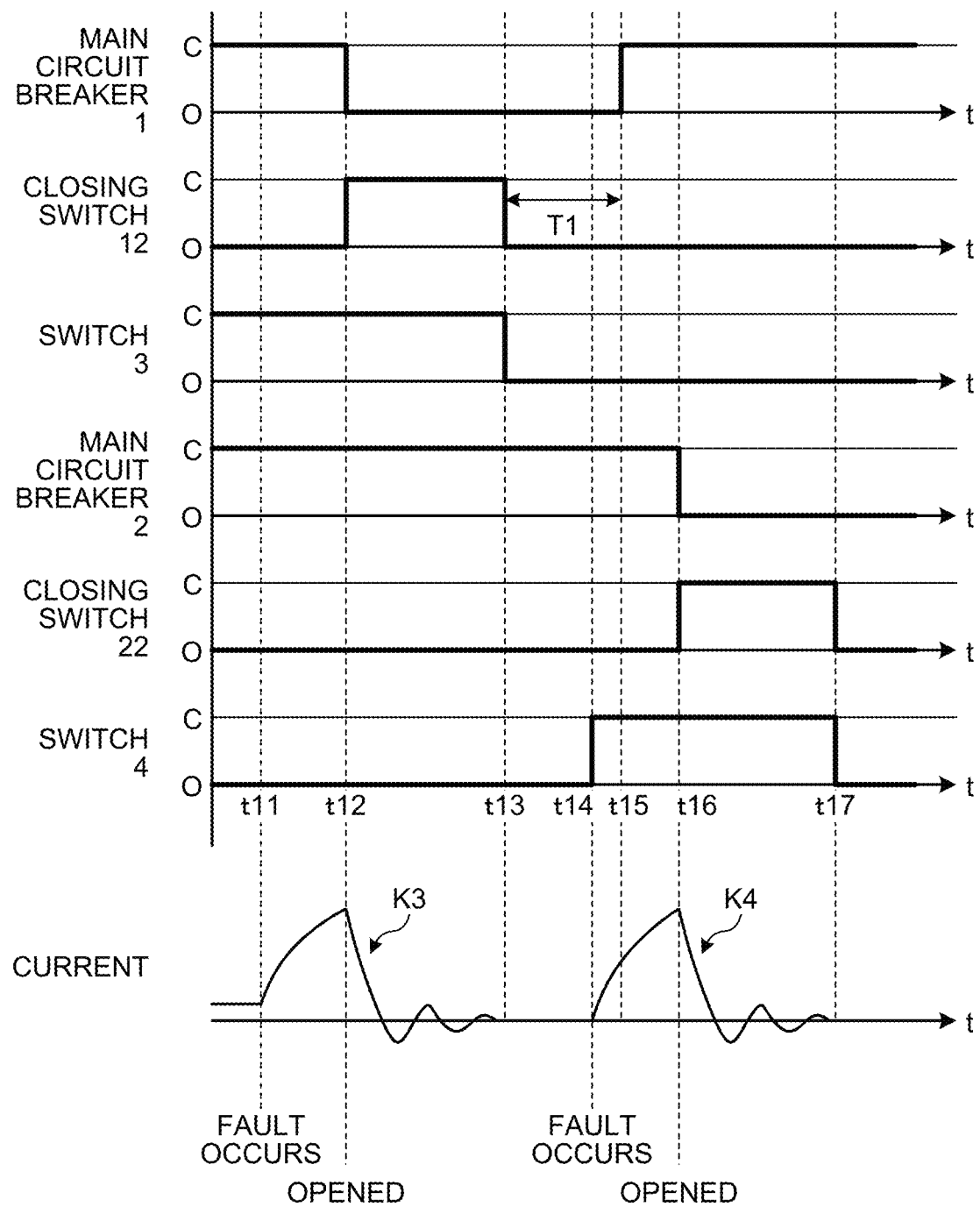
FIG. 6 is a timing chart for explaining an operation of the direct-current circuit breaker according to the second embodiment.

Next, an operation of the direct-current circuit breaker 100A according to the second embodiment will be described with reference to FIGS. 5 and 6. FIG. 6 is a timing chart for explaining the operation of the direct-current circuit breaker 100A according to the second embodiment. FIG. 6 illustrates states of the main circuit breaker 1, the closing switch 12, the switch 3, the main circuit breaker 2, the closing switch 22, and the switch 4 in order from top to bottom. In addition, a current flowing in the direct-current line 17 or the direct-current line 18 is illustrated in a lower part of FIG. 6.

Contacts of each switch illustrated in FIG. 5 are in the initial state. In FIG. 5, control is performed so that the main circuit breaker 1 is "closed", the closing switch 12 is "open", the switch 3 is "closed", the main circuit breaker 2 is "closed", the closing switch 22 is "open", and the switch 4 is "open". At that time, a current indicated by a thick solid line flows in the direct-current line 17.

When a fault occurs at time t11, a fault current flows in the direct-current line 17, and the current increases. In order to interrupt the fault current, the main circuit breaker 1 is opened at time t12. At that time, in order to form a current zero point at the contacts of the main circuit breaker 1, the closing switch 12 is closed. Although the main circuit breaker 1 is opened, the current still continues to flow as indicated by waveform K3. The current of waveform K3 is attenuated by resistance on a current path. When the current decreases, the closing switch 12 is opened. At that time, the switch 3 is also opened. The closing switch 12 and the switch 3 are opened at time t13.

When the switch 3 is opened at time t13, control for high-speed reclosing is performed in order to resume power transmission. In the high-speed reclosing, the switch 4 is closed.

By the control for the high-speed reclosing, the switch 4 enters a closed state at time t14. Because the main circuit breaker 1 is in an open state and the main circuit breaker 2 is in a closed state, a current indicated by a thick broken line flows in the direct-current line 18. That is, the current due to the first reclosing flows in the direct-current line 18.

When a fault occurs again after the control for the high-speed reclosing, a fault current flows in the direct-current line 18 and the current increases. FIG. 6 illustrates a situation where a second fault occurs at time t14, that is, immediately after the switch 4 is closed.

At time t15, the main circuit breaker 1 is closed in preparation for next reclosing, that is, second reclosing. This control is unique to the second embodiment, and is not performed in the first embodiment. At time t13, the switch 3 is opened, and therefore, no current flows in the direct-current line 17.

In FIG. 6, the closing switch 12 is opened at time t13, but there is no limitation thereto. As illustrated in FIG. 6, the switch 3 is open between time t13 and time t15; therefore, the current from the direct-current line 17 does not flow into the capacitor 13 even when the closing switch 12 is closed. Accordingly, the control for opening the closing switch 12 can be performed in period T1 lasting from time t13 to time t15 at which the main circuit breaker 1 is closed.

Due to the second fault at time t14, the main circuit breaker 2 is opened at time t16. At that time, in order to form a current zero point at the contacts of the main circuit breaker 2, the closing switch 22 is closed.

Although the main circuit breaker 2 is opened, the current still continues to flow as indicated by waveform K4. However, as with the fault at time t11, the resistance increases due to the characteristics of MOSA, and thereby the current of waveform K4 decreases. When the current decreases, the closing switch 22 is opened. FIG. 6 illustrates, by way of example, a situation where the switch 4 and the closing switch 22 are simultaneously opened at time t17. The closing switch 22 is opened simultaneously with the switch 4 or may be opened later than the switch 4.

Next, advantageous effects of the direct-current circuit breaker 100A according to the second embodiment will be described. The direct-current circuit breaker 100A according to the second embodiment has the following advantageous effects in addition to the advantageous effects of the first embodiment.

In the first embodiment, the closing switch 12 is closed at time t2 in order to form a current zero point when the first fault current is interrupted. In order to carry a current in the direct-current line 18, thereafter, the closing switch 12 is opened at time t3, and the switch 4 is closed at time t4. That is, in the first embodiment, it is necessary to open the closing switch 12 and subsequently close the switch 4. In other words, it is necessary to close the closing switch 12 at time t2 and subsequently open the closing switch 12 at time t3. For this reason, an expensive switch providing a small mechanical operation delay needs to be used as the closing switch 12.

On the other hand, in the second embodiment, the closing switch 12 is closed at time t12 in order to form a current zero point when the first fault current is interrupted. In order to carry a current in the direct-current line 18, thereafter, the switch 3 is opened at time t13 and the switch 4 is closed at time t14. As described above, it is only required that the closing switch 12 be opened in period T1 between time t13 and time t15. Accordingly, unlike the first embodiment, it is not necessary to open the closing switch 12 and subsequently close the switch 4 in the second embodiment. That is, in the second embodiment, it is not necessary to close the switch 4 after waiting for the operation of opening the closing switch 12. This makes it possible to perform switching from the direct-current line 17 to the direct-current line 18 quickly.

In the first embodiment, it is necessary to close the main circuit breaker 1 in order to carry a current in the direct-current line 17 after the second fault current is interrupted. At that time, in the configuration of the first embodiment, there is a possibility that, when the main circuit breaker 1 is closed, electrodes as contacts are damaged by a pre-arc; as a result, breaking performance of the circuit breaker is deteriorated. For this reason, the timing chart of FIG. 3 does not illustrate the control for closing the main circuit breaker 1.

On the other hand, in the second embodiment, the switch 3 is opened at time t13 and the closing switch 12 is opened in period T1, thereby allowing the main circuit breaker 1 to be closed. Accordingly, even when the main circuit breaker 1 is closed, no pre-arc occurs. Thus, the deterioration of the breaking performance in the main circuit breaker 1 is suppressed.

In the configuration of the second embodiment, the switch 3 is closed after the main circuit breaker 1 is closed. The switch 3 is not used to interrupt a current; therefore, damage to the contacts due to the pre-arc hardly becomes a problem as compared with the main circuit breaker 1.

FIG. 5 illustrates the configuration in which one circuit unit including the main circuit breaker 2 connected in parallel to the main circuit breaker 1, the resonance circuit 20, the MOSA 21, and the switch 4 connected in series to the main circuit breaker 2 is added to a basic configuration including the main circuit breaker 1, the switch 3, the resonance circuit 10, and the MOSA 11, but there is no limitation to the configuration. A plurality of circuit units each including the main circuit breaker 2, the switch 4, the resonance circuit 20, and the MOSA 21 may be provided, and each of the circuit units may be configured to be connected in parallel to the main circuit breaker 1.

Figure 7:
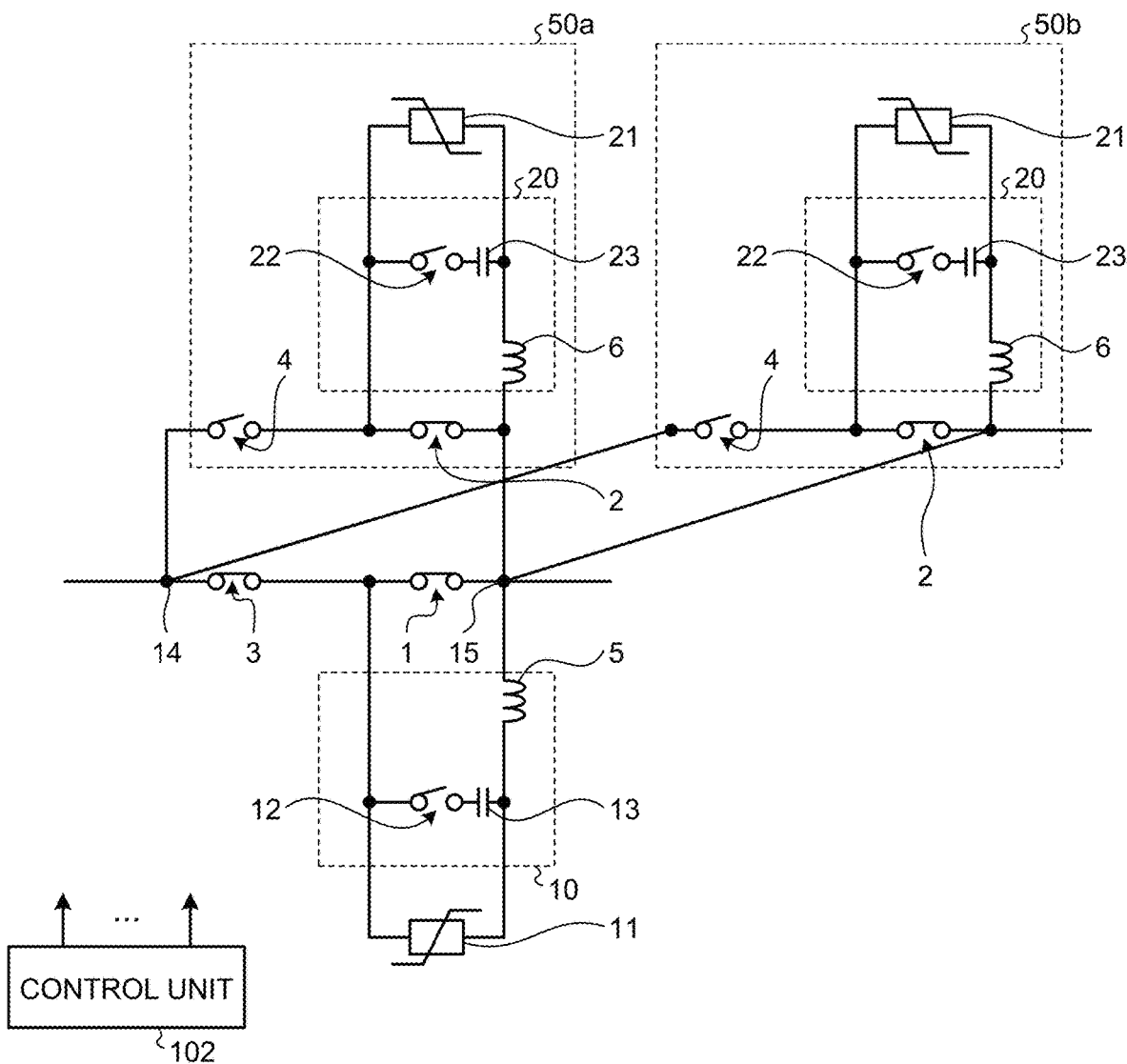
FIG. 7 is a diagram illustrating another example circuit configuration of the direct-current circuit breaker according to the second embodiment.

FIG. 7 discloses a configuration that includes, in addition to the first circuit unit 50a including the main circuit breaker 2, the switch 4, the resonance circuit 20, and the MOSA 21, the second circuit unit 50b including the same components as those of the first circuit unit 50a. In the case of the configuration illustrated in FIG. 7, the second circuit unit 50b can be used when a failure occurs in the first circuit unit 50a for some reason such as failure to sufficiently charge the capacitor 23 of the first circuit unit 50a, and a lightning arrester of the first circuit unit 50a having already absorbed the fault current plural times.

Third Embodiment

Figure 8:
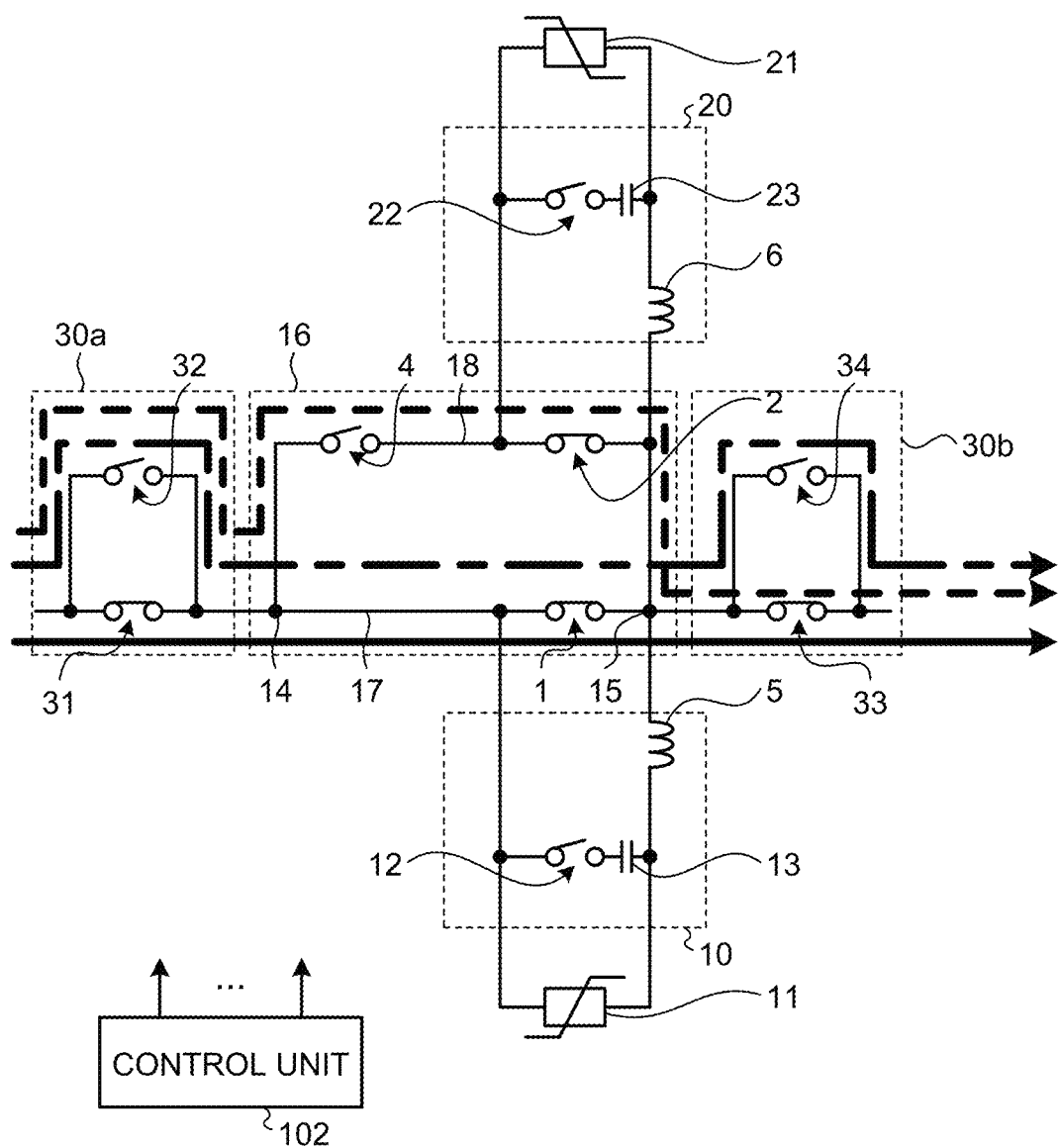
FIG. 8 is a diagram illustrating an example circuit configuration of a direct-current circuit breaker according to a third embodiment.

FIG. 8 is a diagram illustrating an example circuit configuration of a direct-current circuit breaker according to a third embodiment. A direct-current circuit breaker 100B according to the third embodiment illustrated in FIG. 8 differs from the direct-current circuit breaker 100 according to the first embodiment illustrated in FIG. 1 in that a first switch circuit unit 30a is provided upstream of the direct-current line 17 and a second switch circuit unit 30b is provided downstream of the direct-current line 17. The first switch circuit unit 30a includes a circuit breaker 31 and a circuit breaker 32, and the second switch circuit unit 30b includes a circuit breaker 33 and a circuit breaker 34. Examples of the circuit breakers 31, 32, 33, and 34 are gas circuit breakers or vacuum circuit breakers.

In the first switch circuit unit 30a, the circuit breaker 31 and the circuit breaker 32 are connected in parallel. In the second switch circuit unit 30b, the circuit breaker 33 and the circuit breaker 34 are connected in parallel. The first switch circuit unit 30a is disposed on an upper side of the connection point 14. The second switch circuit unit 30b is disposed on a lower side of the connection point 15. The other components are the same as or equivalent to those in FIG. 1. The same or equivalent components are denoted by the same reference numerals, and the duplicate description thereof will be omitted. The circuit breaker 31, the circuit breaker 32, the circuit breaker 33, and the circuit breaker 34 may be referred to as a "first auxiliary circuit breaker", a "second auxiliary circuit breaker", a "third auxiliary circuit breaker", and a "fourth auxiliary circuit breaker", respectively.

Figure 9:
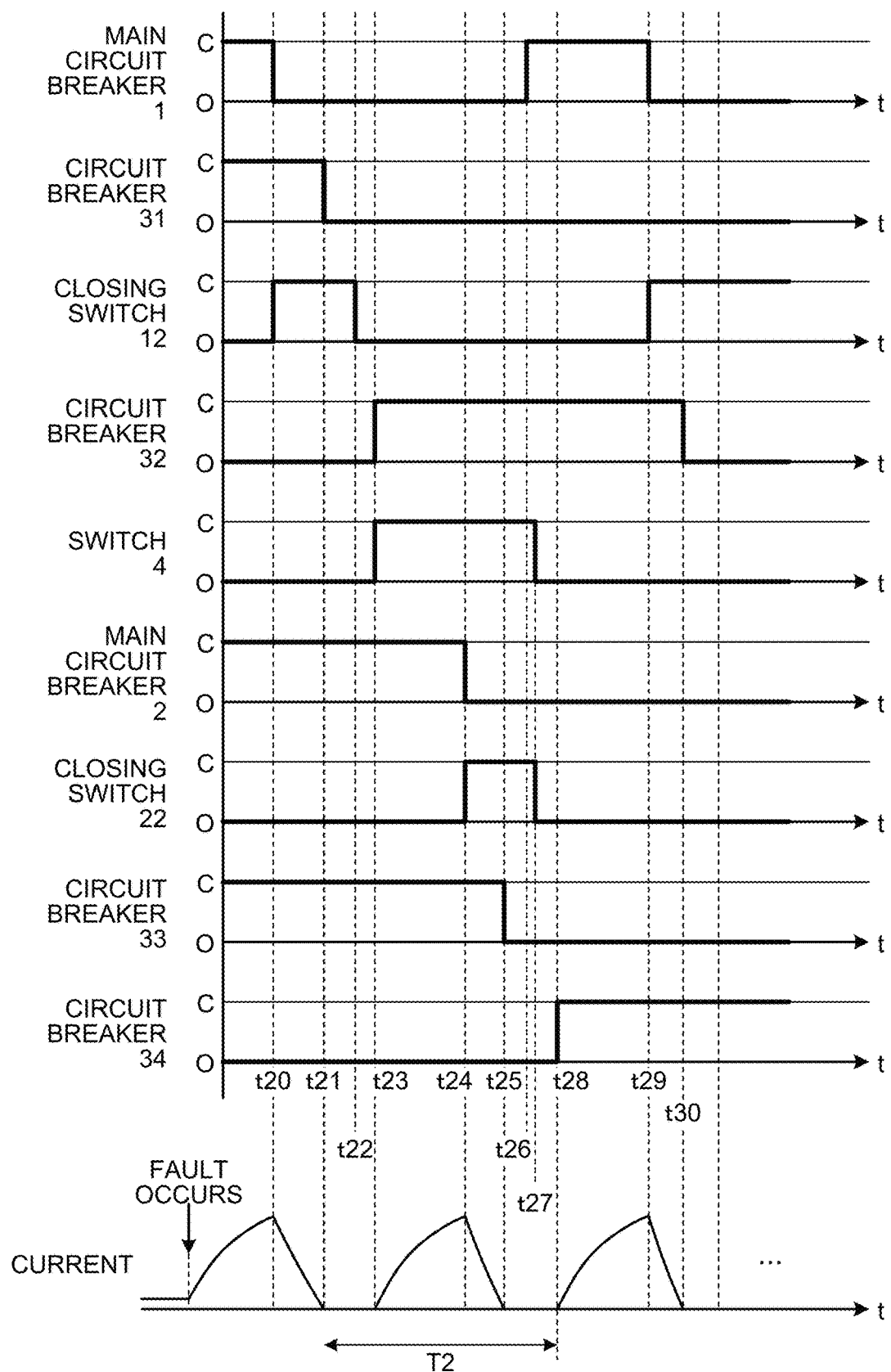
FIG. 9 is a timing chart for explaining an operation of the direct-current circuit breaker according to the third embodiment.

Next, an operation of the direct-current circuit breaker 100B according to the third embodiment will be described with reference to FIGS. 8 and 9. FIG. 9 is a timing chart for explaining the operation of the direct-current circuit breaker 100B according to the third embodiment. FIG. 9 illustrates states of the main circuit breaker 1, the circuit breaker 31, the closing switch 12, the circuit breaker 32, the switch 4, the main circuit breaker 2, the closing switch 22, the circuit breaker 33, and the circuit breaker 34 in order from top to bottom. In addition, a current flowing in the direct-current line 17 or the direct-current line 18 is illustrated in a lower part of FIG. 9.

Contacts of each switch illustrated in FIG. 8 are in a state at a time when a fault current is flowing in the direct-current line 17. In FIG. 8, control is performed so that the main circuit breaker 1 is "closed", the circuit breaker 31 is "closed", the closing switch 12 is "open", the circuit breaker 32 is "open", the switch 4 is "open", the main circuit breaker 2 is "closed", the closing switch 22 is "open", the circuit breaker 33 is "closed", and the circuit breaker 34 is "open". At that time, a current indicated by a thick solid line flows in the direct-current line 17.

In order to interrupt the fault current, the main circuit breaker 1 is opened at time t20. In addition, in order to form a current zero point at the contacts of the main circuit breaker 1, the closing switch 12 is closed at time t20.

As described above, although the main circuit breaker 1 is opened, the current still continues to flow through the MOSA 11. When the current flowing through the MOSA 11 decreases, the circuit breaker 31 is opened at time t21.

The closing switch 12 is opened at time t22. At that time, a voltage to be applied to the main circuit breaker 1 at a time of next opening of the main circuit breaker 1 remains at the capacitor 13. Any method may be used to have the voltage remain at the capacitor 13. The capacitor 13 is generally configured to be grounded via a charging resistor (not illustrated). A switch is provided in series to the charging resistor and the switch is controlled such that the switch is "open", thereby preventing charges accumulated in the capacitor 13 from being discharged.

Reference is made back to FIG. 9. When the closing switch 12 is opened at time t22, control for high-speed reclosing is performed in order to resume power transmission. In the configuration of the third embodiment, the circuit breaker 32 and the switch 4 are closed at time t23 in first high-speed reclosing. In order to prevent a pre-arc in the circuit breaker 32, the circuit breaker 32 needs to be closed earlier than the switch 4.

By the control for the first high-speed reclosing, the switch 4 and the circuit breaker 32 enter a closed state at time t23. The main circuit breaker 1 is in an open state, and the main circuit breaker 2 and the circuit breaker 33 are in a closed state. As a result, a current indicated by a thick broken line flows in the direct-current line 18. That is, the current due to the first reclosing flows in the direct-current line 18 through the circuit breakers 32 and 33.

When a fault occurs again after the control for the high-speed reclosing, a fault current flows in the direct-current line 18 and the current increases. FIG. 9 illustrates a situation where a second fault occurs at time t23, that is, immediately after the switch 4 and the circuit breaker 32 are closed.

Due to the second fault at time t23, the main circuit breaker 2 is opened at time t24. At that time, in order to form a current zero point at the contacts of the main circuit breaker 2, the closing switch 22 is closed.

Although the main circuit breaker 2 is opened, the current still continues to flow through the MOSA 21. When the current flowing through the MOSA 21 decreases, the circuit breaker 33 interrupts the current. This control is unique to the third embodiment, and is not performed in the first embodiment.

The circuit breaker 33 is opened at time t25. Due to second high-speed reclosing, the main circuit breaker 1 is closed at time t26. The switch 4 and the closing switch 22 are opened at time t27. At that time, a voltage to be applied to the main circuit breaker 2 at a time of next opening of the main circuit breaker 2 remains at the capacitor 23. An example of a method for having the voltage remain at the capacitor 23 is as described above.

In order to resume power transmission, control for the second high-speed reclosing is performed at time t28. At time t28, the circuit breaker 34 is closed.

Immediately after the control for the second high-speed reclosing, the main circuit breaker 1 and the circuit breakers 32 and 34 are in a closed state, and the main circuit breaker 2 is in an open state. As a result, a current indicated by a thick dot-and-dash line flows in the direct-current line 17. That is, the current due to the second reclosing flows in the direct-current line 17 through the circuit breakers 32 and 34.

When a fault occurs again after the control for the second high-speed reclosing, a fault current flows in the direct-current line 17 and the current increases. FIG. 9 illustrates a situation where a third fault occurs at time t28.

Due to the third fault at time t28, the main circuit breaker 1 is opened at time t29. At that time, in order to form a current zero point at the contacts of the main circuit breaker 1, the closing switch 12 is closed.

Although the main circuit breaker 1 is opened, the current still continues to flow through the MOSA 11. When the current flowing through the MOSA 11 decreases, the circuit breaker 32 is opened at time t30. This control is unique to the third embodiment, and is not performed in the first embodiment. The third embodiment includes the circuit breaker 32; the circuit breaker 32 is opened to thereby address the third fault.

The circuit breaker 32 is opened at time t30. Thereafter, the same operations as operations performed after time t23 are repeated. The circuit breaker 31 and the circuit breaker 32 operate alternately, and both the circuit breaker 31 and the circuit breaker 32 do not enter the closed state at the same time. In addition, the circuit breaker 33 and the circuit breaker 34 operate alternately, and both the circuit breaker 33 and the circuit breaker 34 do not enter the closed state at the same time.

Next, advantageous effects of the direct-current circuit breaker 100B according to the third embodiment will be described. The direct-current circuit breaker 100B according to the third embodiment has the following advantageous effects in addition to the advantageous effects of the first embodiment.

As described above, the direct-current circuit breaker 100B according to the third embodiment includes the circuit breakers 31, 32, 33, and 34 that are four auxiliary circuit breakers. These circuit breakers 31, 32, 33, and 34 can interrupt a current flowing through the MOSA 11 or the MOSA 21. This makes it possible to resume power transmission faster in the present embodiment than in the first embodiment.

In the direct-current circuit breaker 100B according to the third embodiment, the main circuit breaker 1 and the main circuit breaker 2 operate alternately. As illustrated in FIG. 9, thus, period T2 is provided between time t21 when a transient current after interruption of the first fault becomes zero and time t28 when the third fault occurs. The provision of the period T2 allows the resonance circuit 10 to be restored to an openable state. This achieves an effect of expanding an allowable range of mechanical operation delay of the main circuit breaker 1. In addition, since period T2 is also provided for the main circuit breaker 2, the effect of expanding the allowable range of mechanical operation delay is also obtained in the main circuit breaker 2.

FIG. 8 illustrates the configuration in which one circuit unit including the main circuit breaker 2 connected in parallel to the main circuit breaker 1, the resonance circuit 20, the MOSA 21, and the switch 4 connected in series to the main circuit breaker 2 is added to a basic configuration including the main circuit breaker 1, the resonance circuit 10, the first switch circuit unit 30*a* including the circuit breakers 31 and 32, and the second switch circuit unit 30*b* including the circuit breakers 33 and 34, but there is no limitation to the configuration. A plurality of circuit units each including the main circuit breaker 2, the switch 4, the resonance circuit 20, and the MOSA 21 may be provided, and each of the circuit units may be configured to be connected in parallel to the main circuit breaker 1.

Figure 10:
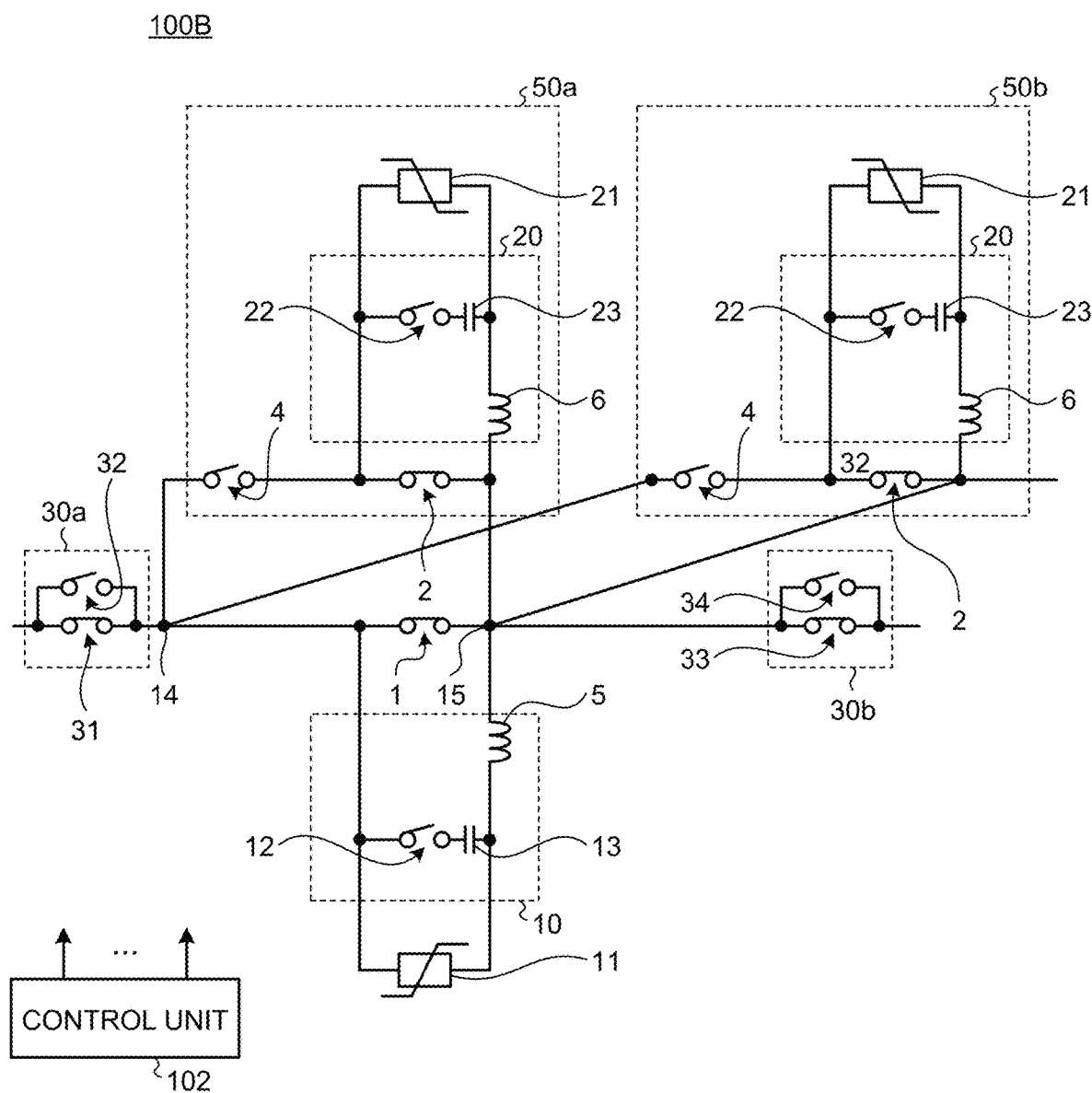
FIG. 10 is a diagram illustrating another example circuit configuration of the direct-current circuit breaker according to the third embodiment.

FIG. 10 discloses a configuration that includes, in addition to the first circuit unit 50*a* including the main circuit breaker 2, the switch 4, the resonance circuit 20, and the MOSA 21, the second circuit unit 50*b* including the same components as those of the first circuit unit 50*a*. In the case of the configuration illustrated in FIG. 10, the second circuit unit 50b can be used when a failure occurs in the first circuit unit 50a for some reason such as failure to sufficiently charge the capacitor 23 of the first circuit unit 50a, and a lightning arrester of the first circuit unit 50a having already absorbed the fault current plural times.

Fourth Embodiment

Figure 11:
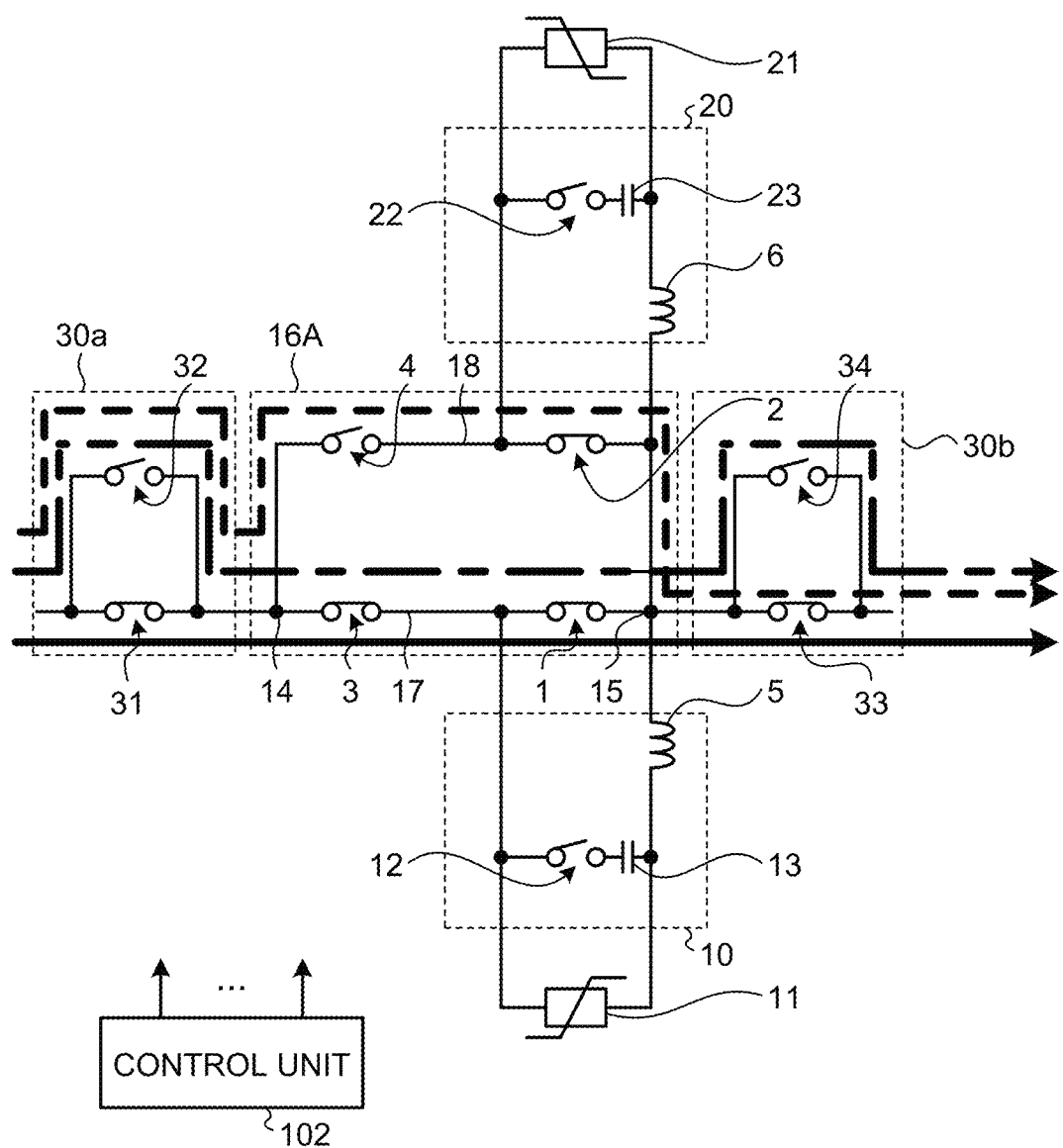
FIG. 11 is a diagram illustrating an example circuit configuration of a direct-current circuit breaker according to a fourth embodiment.

FIG. 11 is a diagram illustrating an example circuit configuration of a direct-current circuit breaker according to a fourth embodiment. A direct-current circuit breaker 100C according to the fourth embodiment illustrated in FIG. 11 differs from the direct-current circuit breaker in the third embodiment illustrated in FIG. 8 in that the parallel circuit 16A replaces the parallel circuit 16. The parallel circuit 16A in FIG. 11 differs from the parallel circuit 16 illustrated in FIG. 8 in that the switch 3 is added. The switch 3 is a switch for high-speed reclosing. The main circuit breaker 1 and the switch 3 are connected in series. A series circuit including the main circuit breaker 1 and the switch 3 is connected to opposite ends of a series circuit including the main circuit breaker 2 and the switch 4. That is, the series circuit including the main circuit breaker 1 and the switch 3 is connected in parallel to the series circuit including the main circuit breaker 2 and the switch 4. The main circuit breaker 1 is disposed downstream of the switch 3. In other words, the switch 3 is disposed upstream of the main circuit breaker 1. The other components are the same as or equivalent to those in FIG. 8. The same or equivalent components are denoted by the same reference numerals, and the duplicate description thereof will be omitted.

Figure 12:
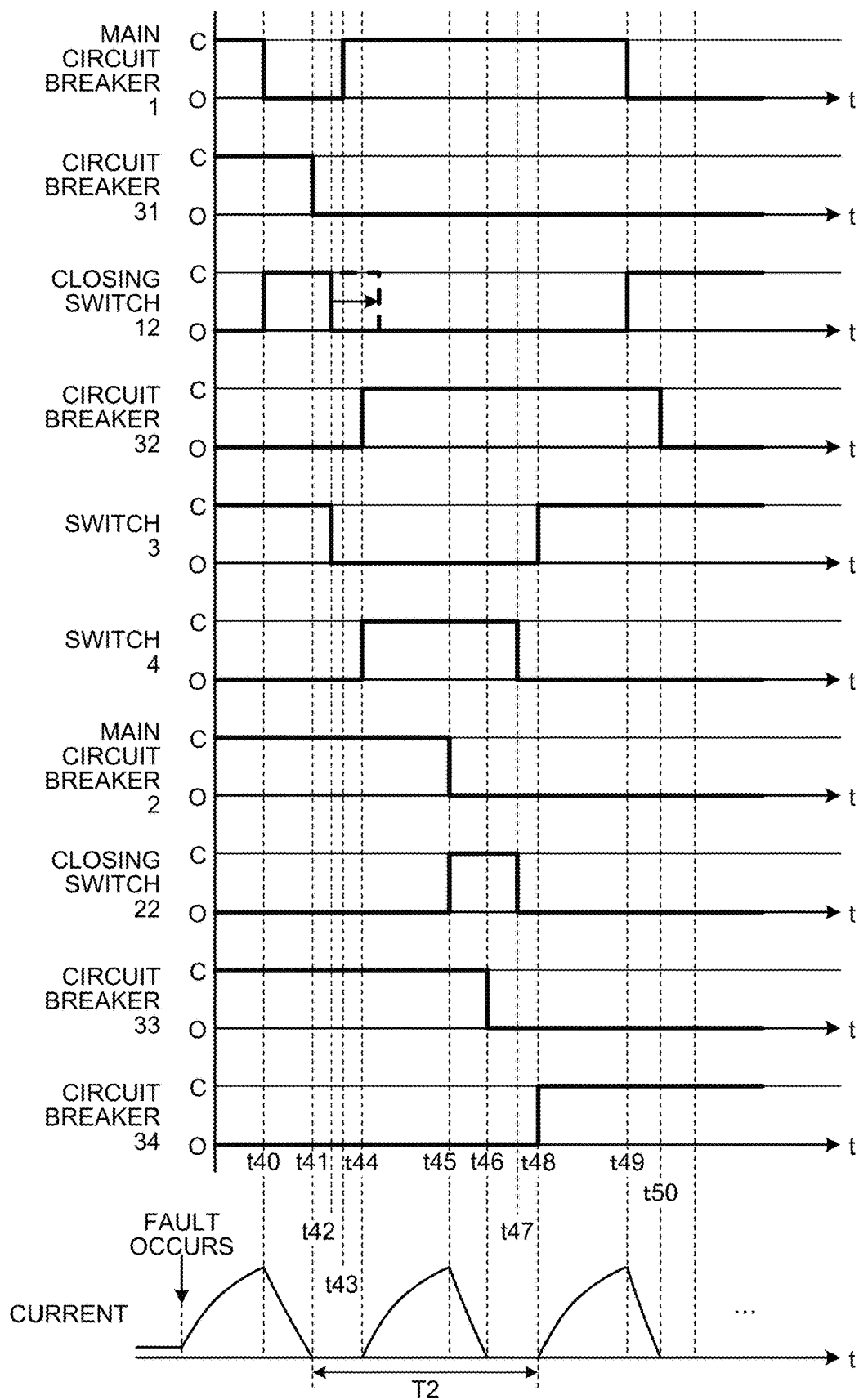
FIG. 12 is a timing chart for explaining an operation of the direct-current circuit breaker according to the fourth embodiment.

Next, an operation of the direct-current circuit breaker 100C according to the fourth embodiment will be described with reference to FIGS. 11 and 12. FIG. 12 is a timing chart for explaining the operation of the direct-current circuit breaker 100C according to the fourth embodiment. FIG. 12 illustrates states of the main circuit breaker 1, the circuit breaker 31, the closing switch 12, the circuit breaker 32, the switch 3, the switch 4, the main circuit breaker 2, the closing switch 22, the circuit breaker 33, and the circuit breaker 34 in order from top to bottom. In addition, a current flowing in the direct-current line 17 or the direct-current line 18 is illustrated in a lower part of FIG. 12.

Contacts of each switch illustrated in FIG. 11 is in a state at a time when a fault current is flowing in the direct-current line 17. In FIG. 11, control is performed so that the main circuit breaker 1 is "closed", the circuit breaker 31 is "closed", the closing switch 12 is "open", the circuit breaker 32 is "open", the switch 3 is "closed", the switch 4 is "open", the main circuit breaker 2 is "closed", the closing switch 22 is "open", the circuit breaker 33 is "closed", and the circuit breaker 34 is "open". At that time, a current indicated by a thick solid line flows in the direct-current line 17.

In order to interrupt the fault current, the main circuit breaker 1 is opened at time t40. In addition, in order to form a current zero point at the contacts of the main circuit breaker 1, the closing switch 12 is closed at time t40.

As described above, although the main circuit breaker 1 is opened, the current still continues to flow through the MOSA 11. When the current flowing through the MOSA 11 decreases, the circuit breaker 31 is opened at time t41.

The closing switch 12 and the switch 3 are opened at time t42. At that time, a voltage to be applied to the main circuit breaker 1 at a time of next opening of the main circuit breaker 1 remains at the capacitor 13. The method for having the voltage remain at the capacitor 13 is as described in the third embodiment. In FIG. 12, the closing switch 12 is opened at time t42, but timing at which to open the closing switch 12 can be delayed as illustrated. When the switch 3 is in an open state, any timing may be used for the opening the closing switch 12.

Reference is made back to FIG. 12. When the closing switch 12 and the switch 3 are opened at time t42, control for high-speed reclosing is performed in order to resume power transmission. In the configuration of the fourth embodiment, the circuit breaker 32 and the switch 4 are closed at time t44 in first high-speed reclosing. In order to prevent a pre-arc in the circuit breaker 32, the circuit breaker 32 needs to be closed earlier than the switch 4.

In the control for the first high-speed reclosing, the main circuit breaker 1 can be closed in advance. This control is not performed in the third embodiment. In FIG. 12, the main circuit breaker 1 is closed at time t43. In order to prevent a pre-arc in the main circuit breaker 1, the main circuit breaker 1 is preferably closed after the closing switch 12 is opened. Since the main circuit breaker 1 is closed after both the switch 3 and the closing switch 12 are opened, no current flows in the direct-current line 17. In addition, since the main circuit breaker 1 is closed with the circuit breakers 31 and 32 open, a pre-arc can be prevented.

By the control for the first high-speed reclosing, the switch 4 and the circuit breaker 32 enter a closed state at time t44. The main circuit breaker 2 and the circuit breaker 33 are in a closed state. The main circuit breaker 1 is also in a closed state, but the switch 3 is in an open state. As a result, a current indicated by a thick broken line flows in the direct-current line 18. That is, the current due to the first reclosing flows in the direct-current line 18 through the circuit breakers 32 and 33.

When a fault occurs again after the control for the high-speed reclosing, a fault current flows in the direct-current line 18 and the current increases. FIG. 12 illustrates a situation where a second fault occurs at time t44, that is, immediately after the switch 4 and the circuit breaker 32 are closed.

Due to the second fault at time t44, the main circuit breaker 2 is opened at time t45. At that time, in order to form a current zero point at the contacts of the main circuit breaker 2, the closing switch 22 is closed.

Although the main circuit breaker 2 is opened, the current still continues to flow through the MOSA 21. When the current flowing through the MOSA 21 decreases, the circuit breaker 33 is opened.

The circuit breaker 33 is opened at time t46. The switch 4 and the closing switch 22 are opened at time t47. At that time, a voltage to be applied to the main circuit breaker 2 at a time of next opening of the main circuit breaker 2 remains at the capacitor 23.

In order to resume power transmission, control for the second high-speed reclosing is performed at time t48. At time t48, the switch 3 and the circuit breaker 34 are closed.

Immediately after the control for the second high-speed reclosing, the main circuit breaker 1, the switch 3, and the circuit breakers 32 and 34 are in a closed state, and the main circuit breaker 2 is in an open state. As a result, a current indicated by a thick dot-and-dash line flows in the direct-current line 17. That is, the current due to the second reclosing flows in the direct-current line 17 through the circuit breakers 32 and 34.

When a fault occurs again after the control for the second high-speed reclosing, a fault current flows in the direct-current line 17 and the current increases. FIG. 12 illustrates a situation where a third fault occurs at time t48.

Due to the third fault at time t48, the main circuit breaker 1 is opened at time t49. At that time, in order to form a current zero point at the contacts of the main circuit breaker 1, the closing switch 12 is closed.

Although the main circuit breaker 1 is opened, the current still continues to flow through the MOSA 11. When the current flowing through the MOSA 11 decreases, the circuit breaker 32 is opened at time t50. Thereafter, the same operations as operations performed after time t44 are repeated. The circuit breaker 31 and the circuit breaker 32 operate alternately, and both the circuit breaker 31 and the circuit breaker 32 do not enter the closed state at the same time. In addition, the circuit breaker 33 and the circuit breaker 34 operate alternately, and both the circuit breaker 33 and the circuit breaker 34 do not enter the closed state at the same time.

Next, advantageous effects of the direct-current circuit breaker 100C according to the fourth embodiment will be described. The direct-current circuit breaker 100C according to the fourth embodiment has the following advantageous effects in addition to the advantageous effects of the third embodiment.

In the third embodiment, the closing switch 12 is closed at time t20 in order to form a current zero point when the first fault current is interrupted. In order to carry a current in the direct-current line 18, thereafter, the closing switch 12 is opened at time t22, and the switch 4 is closed at time t23. That is, in the third embodiment, it is necessary to open the closing switch 12 and subsequently close the switch 4. That is, it is necessary to close the closing switch 12 at time t20 and subsequently open the closing switch 12 at time t22. For this reason, an expensive switch providing a small mechanical operation delay needs to be used as the closing switch 12.

On the other hand, in the fourth embodiment, the closing switch 12 is closed at time t40 in order to form a current zero point when the first fault current is interrupted. In order to carry a current in the direct-current line 18, thereafter, the switch 3 is opened at time t42 and the switch 4 is closed at time t44. As described above, the closing switch 12 can be opened even after the switch 4 is closed. Accordingly, unlike the third embodiment, it is not necessary to open the closing switch 12 and subsequently close the switch 4 in the fourth embodiment. That is, in the fourth embodiment, it is not necessary to close the switch 4 after waiting for the operation of opening the closing switch 12. This makes it possible to perform switching from the direct-current line 17 to the direct-current line 18 quickly.

In the third embodiment, it is necessary to close the main circuit breaker 1 in order to carry a current in the direct-current line 17 after the second fault current is interrupted. At that time, in the configuration of the third embodiment, there is a possibility that, when the main circuit breaker 1 is about to be closed, electrodes as contacts are damaged by a pre-arc; as a result, breaking performance of the circuit breaker is deteriorated.

On the other hand, in the fourth embodiment, both of the circuit breakers 31 and 32 are open between time t41 and time t44, and even when the main circuit breaker 1 is closed, no pre-arc occurs as long as the closing switch 12 has been already opened. Thus, the deterioration of the breaking performance in the main circuit breaker 1 is suppressed.

In the configuration of the fourth embodiment, the switch 3 is closed after the main circuit breaker 1 is closed. The switch 3 is not used to interrupt the fault current. The switch 3 is closed in the case of a normal current not the fault current. For this reason, damage to the contacts due to the pre-arc hardly becomes a problem as compared with the main circuit breaker 1.

FIG. 11 illustrates the configuration in which one circuit unit including the main circuit breaker 2 connected in parallel to the main circuit breaker 1, the resonance circuit 20, the MOSA 21, and the switch 4 connected in series to the main circuit breaker 2 is added to a basic configuration including the main circuit breaker 1, the switch 3, the resonance circuit 10, the first switch circuit unit 30a including the circuit breakers 31 and 32, and the second switch circuit unit 30b including the circuit breakers 33 and 34, but there is no limitation to the configuration. A plurality of circuit units each including the main circuit breaker 2, the switch 4, the resonance circuit 20, and the MOSA 21 may be provided, and each of the circuit units may be configured to be connected in parallel to the main circuit breaker 1.

Figure 13:
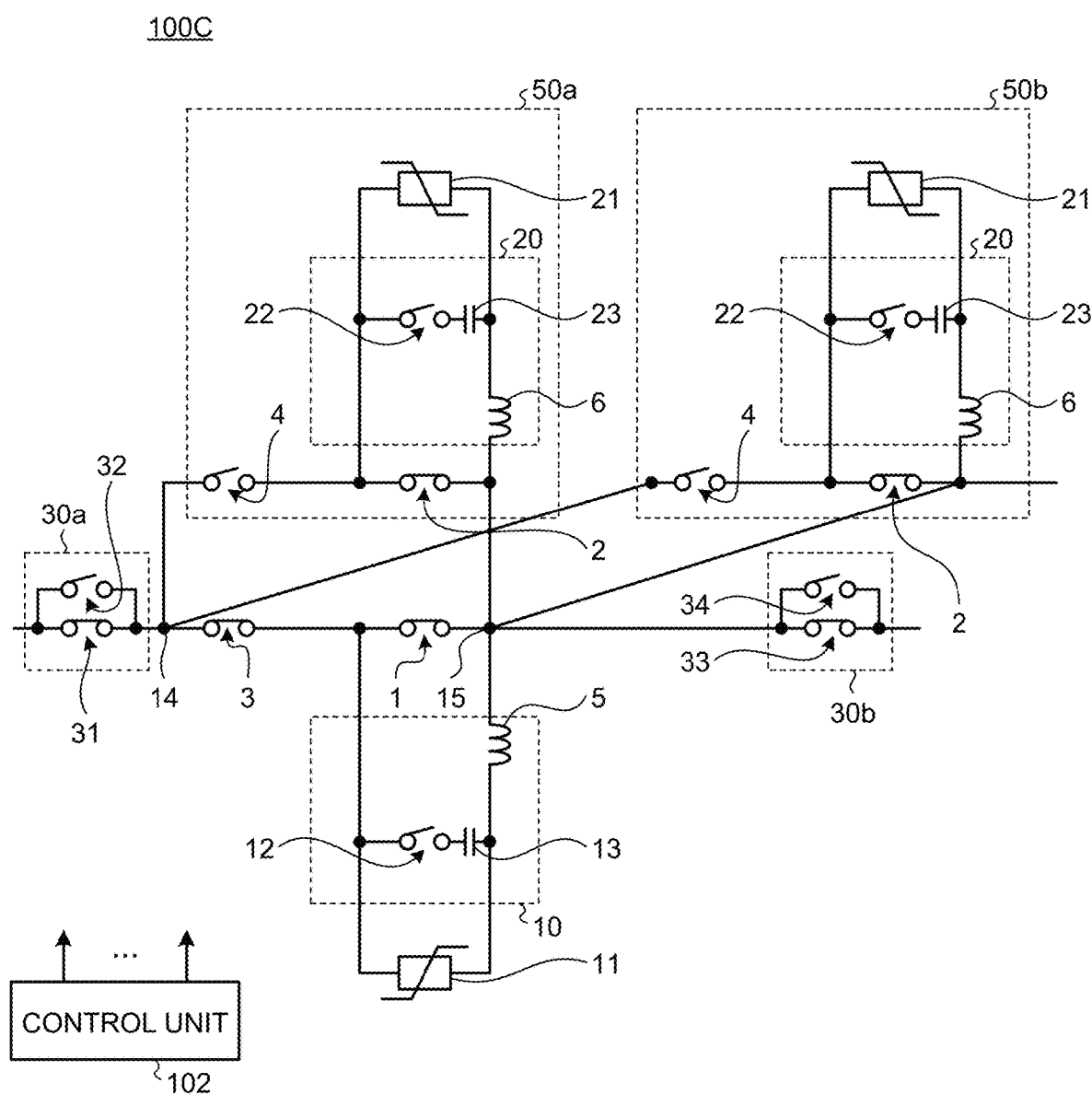
FIG. 13 is a diagram illustrating another example circuit configuration of the direct-current circuit breaker according to the fourth embodiment.

FIG. 13 discloses a configuration that includes, in addition to the first circuit unit 50a including the main circuit breaker 2, the switch 4, the resonance circuit 20, and the MOSA 21, the second circuit unit 50b including the same components as those of the first circuit unit 50a. In the case of the configuration illustrated in FIG. 13, the second circuit unit 50b can be used when a failure occurs in the first circuit unit 50a for some reason such as failure to sufficiently charge the capacitor 23 of the first circuit unit 50a, and a lightning arrester of the first circuit unit 50a having already absorbed the fault current plural times.

The configurations described in the embodiments above are merely examples of the content of the present invention and can be combined with other known technology and part thereof can be omitted or modified without departing from the gist of the present invention.

REFERENCE SIGNS LIST 1, 2 main circuit breaker; 3, 4 switch; 5, 6 reactor; 10, 20 resonance circuit; 11, 21 MOSA; 12, 22 closing switch; 13, 23 capacitor; 14, 15 connection point; 16, 16A parallel circuit; 17, 18 direct-current line; 30a first switch circuit unit; 30b second switch circuit unit; 31, 32, 33, 34 circuit breaker; 50a first circuit unit; 50b second circuit unit; 100, 100A, 100B, 100C direct-current circuit breaker; 102 control unit; 200 CPU; 202 memory; 204 interface.

The invention claimed is:
1. A direct-current circuit breaker comprising:
a first main circuit breaker inserted into a first direct-current line;
a first resonance circuit connected in parallel to the first main circuit breaker and including a closing switch, the closing switch being closed for allowing a current to flow therethrough with the first main circuit breaker opened when a fault current flows through the first direct-current line upon occurrence of fault at the first direct-current line;
a first energy absorber connected in parallel to the first main circuit breaker via the first resonance circuit;
a second main circuit breaker inserted into a second direct-current line that branches off from the first direct-current line and returns to the first direct-current line;
a first switch inserted upstream of the second main circuit breaker in the second direct-current line and connected in series to the second main circuit breaker, the first switch being closed for allowing a current to flow through the second direct-current line when the current flowing through the closing switch of the first resonance circuit is interrupted;
a second resonance circuit including a capacitor and connected in parallel to the second main circuit breaker such that the capacitor is chargeable even when both the second main circuit breaker and the first switch are in an open state; and
a second energy absorber connected in parallel to the second main circuit breaker via the second resonance circuit.

2. The direct-current circuit breaker according to claim 1, comprising a second switch inserted between an upstream connection point of the first direct-current line and the second direct-current line and the first main circuit breaker.

3. The direct-current circuit breaker according to claim 2, comprising:
a plurality of circuit units each including the second main circuit breaker, the first switch connected in series to the second main circuit breaker, and the second resonance circuit connected in parallel to the second main circuit breaker, wherein
each of the plurality of circuit units is connected in parallel to the first main circuit breaker.

4. The direct-current circuit breaker according to claim 1, comprising:
a plurality of circuit units each including the second main circuit breaker, the first switch connected in series to the second main circuit breaker, and the second resonance circuit connected in parallel to the second main circuit breaker, wherein
each of the plurality of circuit units is connected in parallel to the first main circuit breaker.

5. A direct-current circuit breaker comprising:
a first main circuit breaker inserted into a first direct-current line;
a first resonance circuit connected in parallel to the first main circuit breaker;
a first energy absorber connected in parallel to the first main circuit breaker via the first resonance circuit;
a second main circuit breaker inserted into a second direct-current line that branches off from the first direct-current line and returns to the first direct-current line;
a first switch inserted upstream of the second main circuit breaker in the second direct-current line and connected in series to the second main circuit breaker;
a second resonance circuit connected in parallel to the second main circuit breaker;
a second energy absorber connected in parallel to the second main circuit breaker via the second resonance circuit;
a first switch circuit unit including a first auxiliary circuit breaker and a second auxiliary circuit breaker that are connected in parallel, the first switch circuit unit being inserted into the first direct-current line; and
a second switch circuit unit including a third auxiliary circuit breaker and a fourth auxiliary circuit breaker connected in parallel, the second switch circuit unit being inserted into the first direct-current line, wherein
the first switch circuit unit is disposed on an upper side of a first connection point that is an upstream connection point of the first direct-current line and the second direct-current line, and
the second switch circuit unit is disposed on a lower side of a second connection point that is a downstream connection point of the first direct-current line and the second direct-current line.

6. The direct-current circuit breaker according to claim 5, comprising a second switch inserted between an upstream connection point of the first direct-current line and the second direct-current line and the first main circuit breaker.

7. The direct-current circuit breaker according to claim 6, comprising:
a plurality of circuit units each including the second main circuit breaker, the first switch connected in series to the second main circuit breaker, and the second resonance circuit connected in parallel to the second main circuit breaker, wherein
each of the plurality of circuit units is connected in parallel to the first main circuit breaker.

8. The direct-current circuit breaker according to claim 6, wherein
a current due to first reclosing flows in the second direct-current line through the second auxiliary circuit breaker and the third auxiliary circuit breaker, and
a current due to second reclosing flows in the first direct-current line through the second auxiliary circuit breaker and the fourth auxiliary circuit breaker.

9. The direct-current circuit breaker according to claim 5, comprising:
a plurality of circuit units each including the second main circuit breaker, the first switch connected in series to the second main circuit breaker, and the second resonance circuit connected in parallel to the second main circuit breaker, wherein
each of the plurality of circuit units is connected in parallel to the first main circuit breaker.

10. The direct-current circuit breaker according to claim 5, wherein
a current due to first reclosing flows in the second direct-current line through the second auxiliary circuit breaker and the third auxiliary circuit breaker, and
a current due to second reclosing flows in the first direct-current line through the second auxiliary circuit breaker and the fourth auxiliary circuit breaker.

11. A direct-current circuit breaker comprising:
a first main circuit breaker inserted into a first direct-current line;
a first resonance circuit including a first closing switch and a first capacitor connected in series to the first closing switch, the first resonance circuit being connected in parallel to the first main circuit breaker;
a first energy absorber connected in parallel to the first main circuit breaker via the first resonance circuit;
a second main circuit breaker inserted into a second direct-current line that branches off from the first direct-current line and returns to the first direct-current line;
a first switch inserted upstream of the second main circuit breaker in the second direct-current line and connected in series to the second main circuit breaker;
a second switch inserted between an upstream connection point of the first direct-current line and the second direct-current line and the first main circuit breaker;
a second resonance circuit including a second closing switch and a second capacitor connected in series to the second closing switch, the second resonance circuit being connected in parallel to the second main circuit breaker;
a second energy absorber connected in parallel to the second main circuit breaker via the second resonance circuit;
at a first time a fault current flows through the first direct-current line, the first main circuit breaker being opened and the first closing switch being closed at a second time following the first time to attenuate the fault current;

the second switch being opened with the first main circuit breaker opened at a third time following the second time;

the first switch being closed with the first main circuit breaker opened at a fourth time following the third time to allow a current to flow through the second direct-current line;

when a further fault current flows through the second direct-current line with the first switch closed, the first main circuit breaker being closed with the second switch opened at a fifth time following the fourth time, after which the second main circuit breaker is opened and the second closing switch is closed; and the first closing switch being opened in a period lasting from the third time at which the second switch is opened to the fifth time at which the first main circuit breaker is closed.

* * * * *